No. 867,219.

PATENTED SEPT. 24, 1907.

A. C. SWAIN.
GAS LAMP.
APPLICATION FILED JUNE 29, 1907.

2 SHEETS—SHEET 1.

Witnesses:
D. W. Gardner
E. Stern

Inventor:
Alpheus C. Swain
By his Attorney
Geo. Wm. Miatt

No. 867,219. PATENTED SEPT. 24, 1907.
A. C. SWAIN.
GAS LAMP.
APPLICATION FILED JUNE 29, 1907.

2 SHEETS—SHEET 2.

Witnesses:
D. W. Gardner.
E. Stern

Inventor:
Apphious C. Swain
By his Attorney
Geo. W. Miatt

UNITED STATES PATENT OFFICE.

APPIOUS C. SWAIN, OF JERSEY CITY, NEW JERSEY.

GAS-LAMP.

No. 867,219. Specification of Letters Patent. Patented Sept. 24, 1907.

Application filed June 29, 1907. Serial No. 381,387.

*To all whom it may concern:*

Be it known that I, APPIOUS C. SWAIN, a citizen of the United States, residing in Jersey City, Hudson county, and State of New Jersey, have invented certain new and useful Improvements in Gas-Lamps, of which the following is a specification.

My improvements relate to the class of gas lamps in which so called inverted burners and incandescent mantles are used. In this class of lamp it has been customary to utilize the heat of combustion in so far as possible to raise the temperature of the gas on its way to the burners on the theory that combustion is promoted thereby, but this superheating of the gas necessitates a re-adjustment of the gas supply for each burner soon after the gas is lighted, creates back pressure, and promotes the precipitation of carbon within the burner tubes, all objectionable features which my invention is especially designed to obviate. In fact my main object is to maintain the gas at a relatively low temperature until consumed, and to this end I insulate the burner tubes and provide flues for carrying off the products of combustion and inducing a current of air through the lamp to ventilate and cool the same. I also provide for the regulation of the air supply to each burner tube independently and for the delivery of air to the incandescent mantles below the burners, substantially as set forth herein.

My invention also includes certain other special features in the construction and arrangement of parts hereinafter described and claimed.

Figure 1:
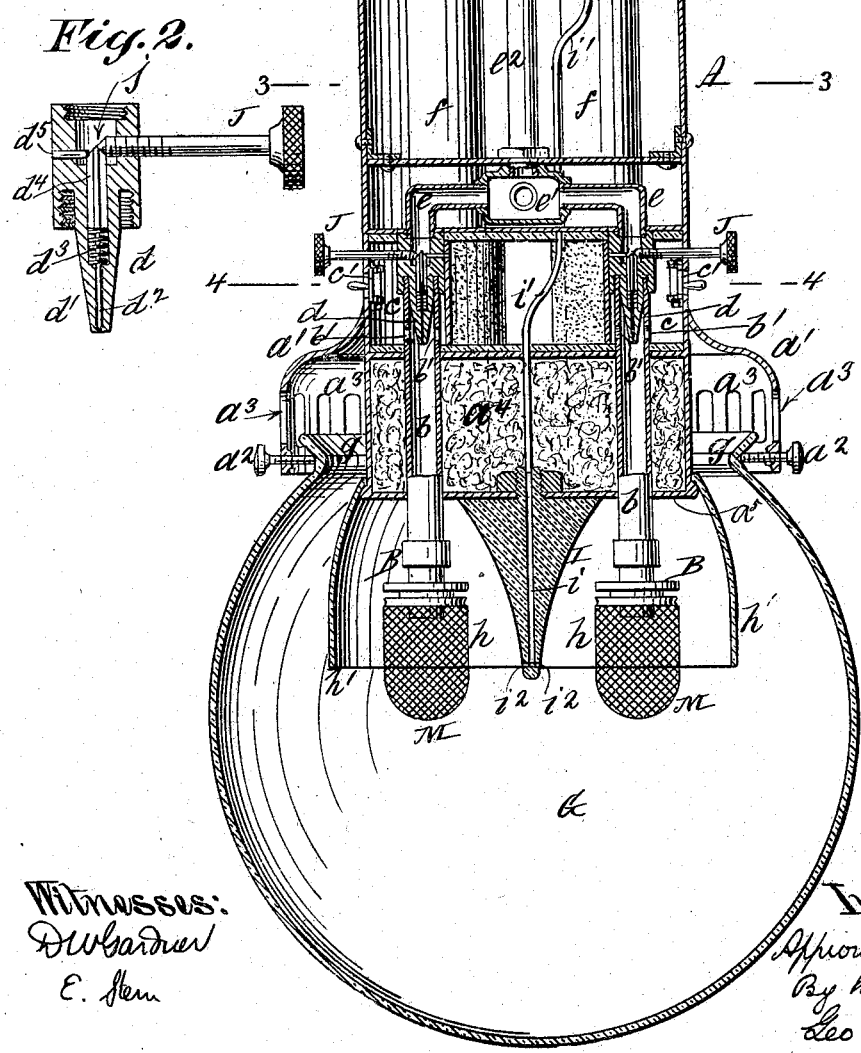
Figure 2:
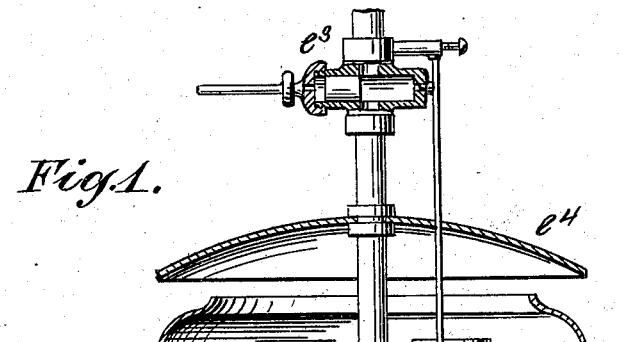
Figure 3:
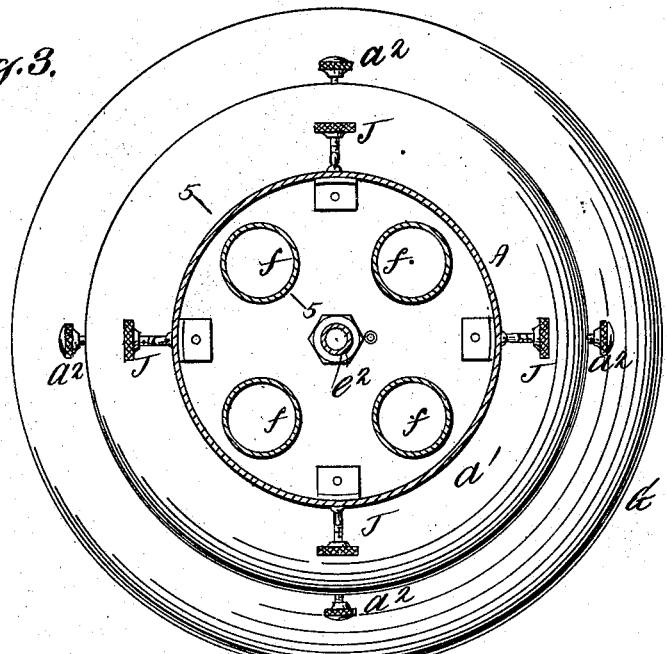
Figure 5:
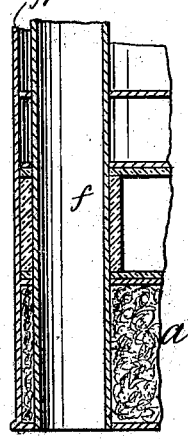
Figure 4:
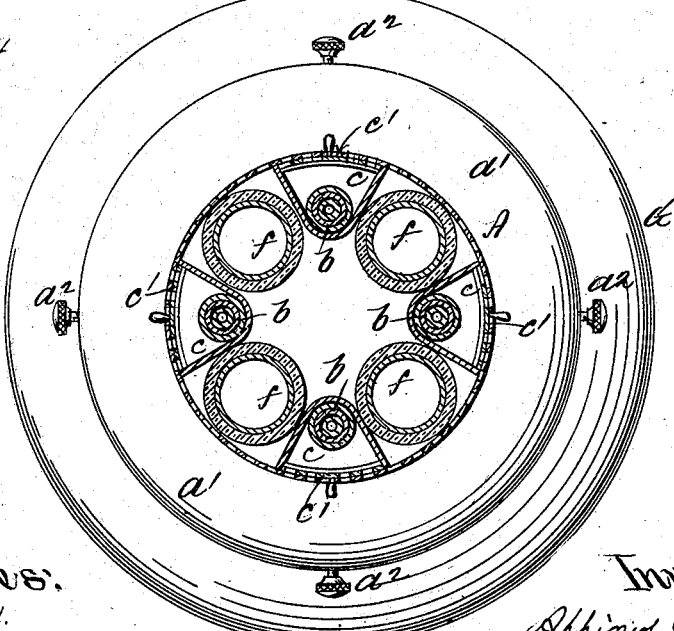

In the accompanying drawings, Figure 1, is a central vertical sectional elevation of a lamp embodying my improvements; Fig. 2, a sectional detail of one of the gas regulators; Fig. 3, a horizontal section on plane of line 3—3—Fig. 1; Fig. 4, a horizontal section upon plane of line 4—4—Fig. 1; Fig. 5, a vertical section upon plane of line 5—5—Fig. 3.

A, represents a cylindrical or other desired form of external shell or casing ornamentally beaded externally, as at $a$, above, and formed with an annular apron $a'$, near its lower extremity having the usual thumb screws $a^2$, for the support of the glass globe G. The apron $a'$, is formed with a series of openings $a^3$, for the admission of air to the globe G, the neck $g$ of which is of greater internal diameter than the diameter of the lower end of the shell A, so as to create an annular passage for communication between the interior of the globe G and the interior of the apron $a'$.

In the accompanying drawings I have shown my lamp as formed with a nest of four equi-distant burners B, although this is not material since the essential features of my invention may be incorporated in a lamp having any desired number of burners,—four however admitting of an advantageous arrangement of parts.

The burners B, as well as the mantles M, may be of any desired or well known construction and need not be described in detail. The burner tubes $b$, pass through a compartment $a^4$, in the lower part of the shell A, said compartment being filled with asbestos fiber or other suitable non-conducting material. The upper end of each burner tube $b$, extends into an individual compartment or air chamber $c$, above the insulating section $a^4$, where it connects with an injector valve $d$, interposed between it and the branch pipe $e$, from the distributing head $e'$, of the main supply pipe $e^2$, which latter is provided with a cut-off valve $e^3$, of any desired construction, that shown in the drawings by way of illustration being of the pneumatic type.

$e^4$, is a ceiling shield supported upon the supply pipe $e^2$, above the open upper end of the shell A and designed to deflect the hot air and products arising through the tubes $f, f$, laterally into the atmosphere and away from the valve $e^3$.

The tubes $f, f$, which act as both ventilating and chimney flues, extend from the lower plate $a^5$, of the shell A, to the upper portion of the latter, opening at their lower extremities into what may be designated as the combustion chamber $h$, of the lamp,—said combustion chamber consisting of the space below the bottom plate $a^5$, of the shell A inclosed by the apron $h'$, which latter is suspended upon the lower end of said shell, and incloses the burners B and portions of the mantles M adjacent thereto. It is to be understood that the apron $h'$, is preferably formed of glass or other transparent material. This apron $h'$, performs a double function in that it acts not only as a circumscribing wall for the combustion chamber $h$, but also as a deflector for the air entering the globe G through the neck $g$, insuring a uniform distribution of the air to the mantles to promote combustion, and the withdrawing of all air and products of combustion through the flues $f, f$, which act as chimneys to create a draft which insures the induction and passage through the lamp of sufficient air to prevent excessive heating of the parts and maintain the lamp at a relatively low even temperature. This feature of forced ventilation is an important feature of my construction, as is also the removing of the products of combustion from the combustion chamber direct and in such manner that the hot gases come in contact only with the extreme lower portions of the burner tubes adjacent to the burners B.

Within the combustion chamber, and arranged centrally with relation thereto and to the burners B and mantles M is an inverted cone I, of refractory material such as porcelain glazed externally to constitute a reflector. In this cone is a central duct $i$, communicating with the pilot tube $i'$, above and with lateral openings or jets $i^2$, below, the ends of the jets $i^2$, being opposed to the adjacent mantles and burners, and the pilot tube communicating with the main supply pipe $e^2$, above the valve $e^3$, so as to maintain small torch jets for the purpose of effecting the preliminary ignition of the gas when turned on to the burners in the usual way. This inverted cone I, not only acts as a reflector of light, but also insulates and protects the end of the pilot tube, at the same time acting as a deflector to guide the products of combustion and the induced air current to the lower ends of the flues $f, f$, thereby in conjunction with the apron $h'$ maintaining an even distribution of air.

Each injector $d$ is formed with the usual nozzle $d'$, containing the needle valve $d^2$, spring $d^3$, and plunger $d^4$, the novelty in the present case consisting in the provision of means whereby the valve may be regulated and set from the exterior of the lamp, without disturbing other parts thereof as has heretofore been necessary. This I accomplish by inclining or beveling the upper end of the plunger $d^4$, and employing a laterally extending adjusting screw $J$ formed with a conical end $j$, for contact with the conical or beveled end of the plunger $d^4$, so that by turning the screw in one direction or the other the needle valve $d^2$, may by reason of the spring $d^3$, be raised or lowered with relation to its seat. The male thread of the screw $J$ engages with a female thread formed for its reception in the valve casing as shown, or in any other stationary part adjacent as may be found most expedient. $d^5$, is a stop or rest for limiting the upward thrust of the plunger.

Each burner tube $b$, is formed with openings $b'$, adjacent to the nozzle $d$, for the admission of air from the compartment $c$, which as before stated is individual to the burner. The supply of air to each of the chambers $c$, is regulated by an individual damper $c'$, so that the air fed to each burner tube may be independently regulated with accuracy to suit the requirements of the particular burner attached, whereas heretofore only a general or average regulation of air to all the burner tubes has been provided for.

I have found by practical experiment that there are advantages in burning the gas "cold". Where the gas is superheated on its passage to the burner it is necessary to readjust the supply soon after lighting in order to compensate for back pressure caused by expansion of the gas and air on the way to the burner after the tubes become hot. By my method the requisite adjustment of gas and air supply being once attained, may be maintained permanently, to all intents and purposes, while provision is made for treating each burner independently not only to meet its special requirements, but also in order that each or any burner may be cut off without disturbing the others, as where a mantle gives out or when it is desired to use a single burner, or less than the whole number of burners at one time. Furthermore, by isolating and protecting the burner tubes and connections, and preventing the contact of the products of combustion therewith, and also by reason of the ventilation effected, I am enabled to effect the perfect combustion of all the fuel and prevent the precipitation of carbon from the gas,—it being well known that where such precipitation of solid matter takes place the efficiency of the lamp is soon impaired. The feature of external adjustment is also of great practical importance, since the opening up of the lamp for this purpose as heretofore is avoided.

What I claim as my invention and desire to secure by Letters Patent is,

1. In a lamp of the character designated, the combination with a plurality of burners, burner tubes and connections, of a partition above the burners separating them from the lamp casing and contents, an annular apron forming a continuation of said partition extending downward and circumscribing the burners to form a combustion chamber, a plurality of chimney flues opening through said partition and arranged to conduct the products of combustion from said combustion chamber, a closed chamber above said partition inclosing the adjacent portions of said chimney flues and the adjacent portions of the burner tubes and pilot tube, and a packing of non-conducting material surrounding the portions of said chimney flues burner tubes and pilot tube, extending through said inclosed chamber, for the purpose described.

2. In a lamp of the character designated, the combination with a plurality of burners, burner tubes and connections, of a partition above the burners separating them from the lamp casing and contents, an apron forming a continuation of said partition, circumscribing the burners and extending below the same to form a combustion chamber, a plurality of chimney flues opening through said partition and arranged to conduct the products of combustion from said combustion chamber, a closed chamber above said partition inclosing the adjacent portions of said chimney flues and the adjacent portions of the burner tubes and pilot tube, and a packing of non-conducting material surrounding the portions of said chimney flues, burner tubes and pilot tube extending through said inclosed chamber, for the purpose described.

3. In a lamp of the character designated, the combination with a plurality of burners, burner tubes and connections, of a partition above the burners separating them from the lamp casing and contents, an apron forming a continuation of said partition, circumscribing the burners and extending below the same to form a combustion chamber, a plurality of chimney flues opening through said partition and arranged to conduct the products of combustion from said combustion chamber, a closed chamber above said partition inclosing the adjacent portions of said chimney flues and the adjacent portions of the burner tubes and pilot tube, and a packing of asbestos surrounding the portions of said chimney flues, burner tubes, and pilot tube extending through said inclosed chamber, for the purpose described.

4. In a lamp of the character designated, the combination with a plurality of burners, burner tubes and connections, of a partition above the burners separating them from the lamp casing and contents, an annular apron forming a continuation of said partition extending downward and circumscribing the burners to form a combustion chamber, and a plurality of chimney flues opening through said partition and arranged to conduct the products of combustion from said combustion chamber to a common outlet in the upper part of the casing above the parts contained and inclosed therein, for the purpose described.

5. In a lamp of the character designated, the combination with a plurality of burners, burner tubes and connections, of a partition above the burners separating them from the lamp casing and contents, an apron forming a continuation of said partition circumscribing the burners and extending below the same to form a combustion chamber, and a plurality of chimney flues opening through said partition and arranged to conduct the products of combustion from said combustion chamber to a common outlet in the upper part of the casing above the parts contained and inclosed therein, for the purpose described.

6. In a lamp of the character designated, the combination with the burners, burner tubes and connections, of a partition above the burners separating them from the lamp casing and contents, an apron forming a continuation of said partition and circumscribing the burners and extending below the same, and one or more flues opening through said partition and arranged to conduct the products of combustion, for the purpose described.

7. In a lamp of the character designated, the combination with the burners, burner tubes and connections, of a partition above the burners separating them from the lamp casing and contents, an apron of transparent material forming a continuation of said partition and circumscribing the burners and extending below the same, and one or more flues opening through said partition and arranged to conduct off the products of combustion for the purpose described.

8. In a lamp of the character designated, the combination with the burners, burner tubes and connections, of a partition above the burners separating them from the lamp casing and contents, an apron forming a continuation of said partition and circumscribing the burners, one or more flues opening through said partition and arranged to conduct off the products of combustion, and an inverted cone of refractory material on the under side of said partition formed with gas ducts and connected with the pilot tube, together with said pilot tube, for the purpose described.

9. In a lamp of the character designated, the combination with the burners, burner tubes and connections, of a separating partition above the burners separating them from the lamp casing and contents, an apron forming a continuation of said partition and circumscribing the burners, one or more flues opening through said partition and arranged to conduct off the products of combustion, and an inverted cone of refractory material on the underside of said partition, said cone being formed with a light-reflecting surface and with gas ducts communicating with the pilot tube, together with said pilot tube, for the purpose described.

10. In a lamp of the character designated, the combination with a plurality of burners, and burner tubes arranged around a common center and a cone of refractory material arranged centrally with relation thereto formed with a light-reflecting surface and with gas ducts communicating with the pilot tube, together with said pilot tube, for the purpose described.

11. In a lamp of the character designated, the combination with a plurality of burners, burner tubes and connections, of a partition separating said burners from the casing, an apron forming a continuation of said partition and circumscribing the burners and extending below them, one or more flues opening through said partition and arranged to conduct off the products of combustion, a chamber above said partition containing a packing of non-conducting material surrounding the burner tubes in part, for the purpose described.

12. In a lamp of the character designated, the combination of a plurality of burners, perforated burner tubes and connections, a partition above the burners separating them from the lamp casing and contents, an annular apron forming a continuation of said partition extending downward and circumscribing the burners to form a combustion chamber, a plurality of chimney flues arranged to conduct the products of combustion from said combustion chamber to a common outlet in the upper part of the casing above the parts contained therein, an injector valve interposed between each of said burner tubes and the main supply pipe, each of said injector valves and the adjacent perforated portion of each burner tube being inclosed in an independent compartment in the casing, said valve compartment and independent means for regulating the admission of air to each of said compartments, whereby the amount of air drawn into each burner tube may be individually regulated, for the purpose described.

13. In a lamp of the character designated, the combination of a plurality of burners, perforated burner tubes and connections, a partition above the burners separating them from the lamp casing and contents, an annular apron forming a continuation of said partition extending downward and circumscribing the burners to form a combustion chamber, a plurality of chimney flues arranged to conduct the products of combustion from said combustion chamber to a common outlet in the upper part of the casing above the parts contained therein, an inclosed insulating compartment above the combustion chamber containing a non-conducting material packed around the portions of the pilot tube, burner tubes and chimney flues extending through said insulating compartment, an injector valve interposed between each of said burner tubes and the main supply pipe, each of said injector valves and the adjacent perforated portion of each burner tube being inclosed in an independent compartment in the casing, above said insulating compartment said valve compartments, and independent means for regulating the admission of air to each of said compartments, whereby the amount of air drawn into each burner tube may be individually regulated, for the purpose described.

14. In a lamp of the character designated, the combination with the burners, burner tubes and connections of a partition above the burner separating them from the casing, an apron forming a continuation of said partition, and extending below and circumscribing the said burners, a compartment above said partition containing a packing of non-conducting material around the adjacent portions of the burner tubes, and injector valve for each burner tube, each injector valve being provided with a lateral adjusting screw extending beyond the casing, for the purpose described.

APPIOUS C. SWAIN.

Witnesses:
D. W. GARDNER,
GEO. WM. MIATT.